Dec. 16, 1941.  G. H. WRIGHT  2,266,529
AIRCRAFT CONTROL DEVICE
Filed Oct. 26, 1938  2 Sheets-Sheet 1

INVENTOR.
GEORGE H. WRIGHT
BY George B. White
ATTORNEY.

Dec. 16, 1941.   G. H. WRIGHT   2,266,529
AIRCRAFT CONTROL DEVICE
Filed Oct. 26, 1938   2 Sheets-Sheet 2
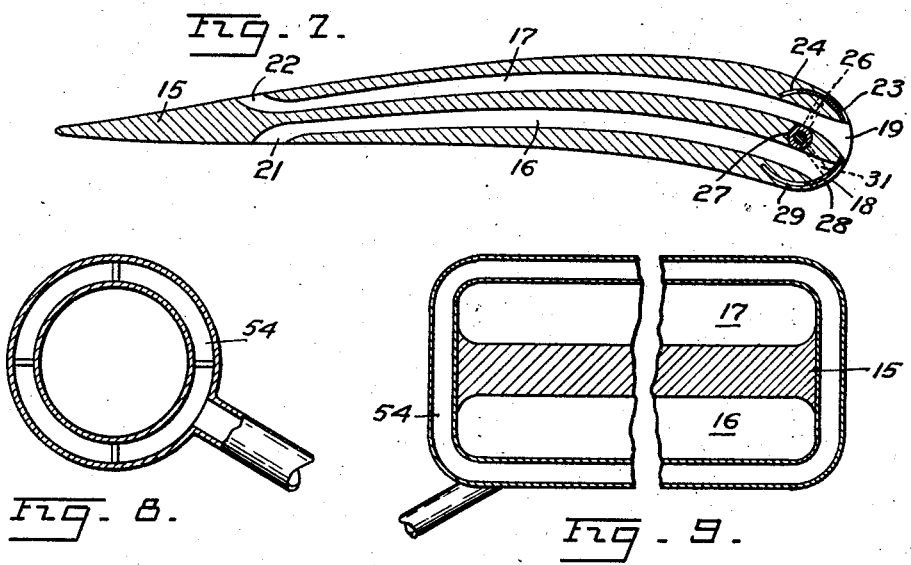
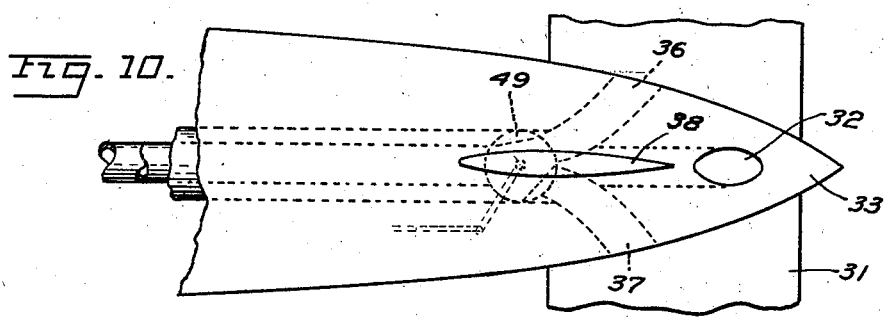
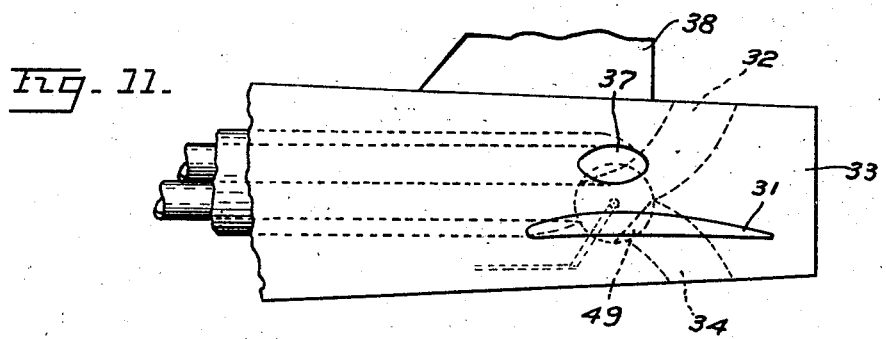
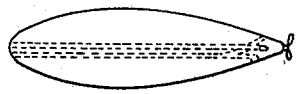
INVENTOR.
GEORGE H. WRIGHT
BY George B. White
ATTORNEY.

Patented Dec. 16, 1941

2,266,529

UNITED STATES PATENT OFFICE 2,266,529

AIRCRAFT CONTROL DEVICE

George H. Wright, San Rafael, Calif.

Application October 26, 1938, Serial No. 237,032

12 Claims. (Cl. 244—87)

This invention relates to aircrafts and particularly to controls for aircrafts.

An object of this invention is to eliminate the necessity for moving air resistance surfaces, or movable aerofoils for the controlling of the attitudes of aircrafts, and thereby to reduce the possibility for accidents frequently caused by reason of failure of such aerofoils or of their guide wires, hinges or control lines.

Particularly it is an object of this invention to provide a method for controlling the attitude of aircrafts wherein the aircurrents outside the aircraft, or an airstream flowing past the aircraft, are directed selectively to various predetermined surface points of the aircraft in such a manner as to cause a pressure change at said selected point for controlling the aircraft.

A further object of the invention is to provide control means for an aircraft whereby a stream of air can be directed to selected points of the surface of the aircraft for controlling or changing the attitude of the same.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variation of my preferred forms within the scope of my invention.

An embodiment of my invention is clearly illustrated in the accompanying drawings, wherein:

Fig. 7 is a sectional view of a wing of an aircraft provided with my control.

Fig. 8 is a cross-sectional detail view of a heated control tube.

Fig. 9 is a cross-sectional detail view of a double tube in the wing.

Fig. 10 is a fragmental top plan view of the tail of an airplane provided with control tubes.

Fig. 11 is a fragmental side view of said tail of an airplane, and

Fig. 12 is a side view of a lighter than aircraft constructed in accordance with my invention.

The attitude of the usual aircraft in flight is determined by the position and angular arrangement of certain adjustable aerofoils or control surfaces, such as the ailerons, elevator, or rudder. All of these surfaces are separate parts and are hinged or otherwise movably joined to wings or fuselage, or body of the aircraft. Brackets, pivots, wires, posts and other exterior structural parts are essential for the mounting and manipulation of all of the usual control surfaces of the usual aircraft. Failure or freezing of such joints or connections is frequent cause of accidents and wrecks.

In my method all exterior adjustable aerofoils are eliminated and control is accomplished by controlled streams of air flowing at selected portions of the aircraft relative to comparatively and preferably fixed planes or surfaces. My method includes the directing of airstreams from the front of an aircraft rearwardly through the respective parts of the aircraft, releasing said streams of air at predetermined points of the aircraft, and controlling said airstreams preferably where they enter the aircraft. Particularly my method consists in directing part of the airflow past an aircraft into a plurality of air passages through the aircraft so that said directed airflow emerges at predetermined points of the aircraft in separate controlled streams for changing the air pressure at their points of emergence thereby changing the attitude of the aircraft.

Figure 1:
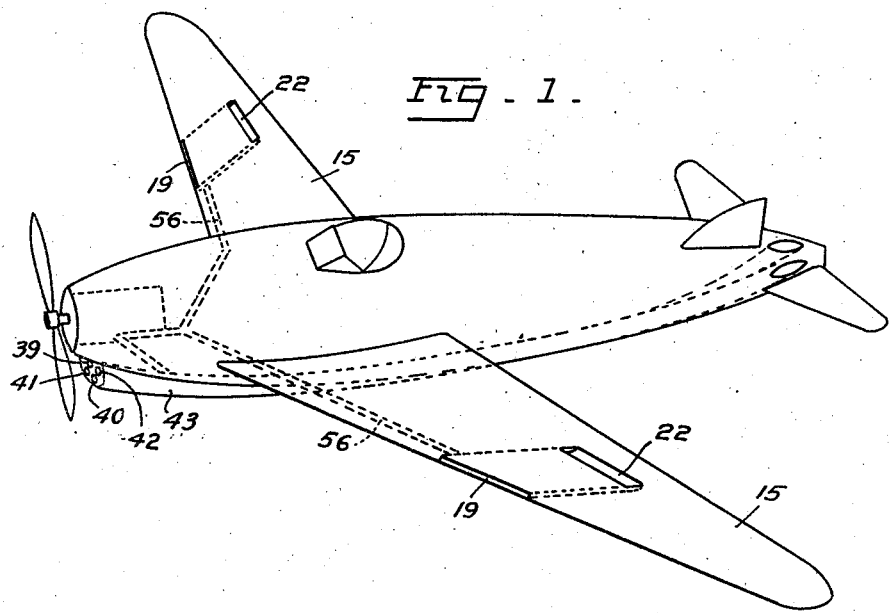
Fig. 1 is a perspective somewhat diagrammatic view of an airplane and my controls thereon.

In this illustration I show an embodiment of my invention in connection with airplanes, however the same can be applied to any and all types of aircrafts such as lighter than air aircrafts, rockets, flying boats, and the like. Wings 15 of the airplane in my invention preferably have no ailerons, but the air pressure on their opposite surfaces is varied by means of tubes as shown in Figures 1, 7 and 9. In each wing 15 there are two parallel passages 16 and 17 one above the other, respectively with inlets 18 and 19 at the leading edge of the wing 15. The lower passage 16 extends rearwardly and then opens downwardly into an outlet 21 located on the underside of the wing 15 near the trailing edge. The upper passage 17 extends rearwardly and then opens upwardly into an outlet 22 on the top surface of the wing 15 near the trailing edge.

Preferably the passages 16 and 17 are transversely elongated to suit conditions; and are rearwardly tapered. The airflow into and through said passages 16 and 17 is controlled by suitable valves preferably at inlets 18 and 19. In the herein illustration an arcuate valve disc 23 slidably fits into a slot 24 above the upper passage 17 and it has an actuating shaft 27 so as to move the disc 23 around the axis of the shaft 27 as a center when the shaft 27 is rocked. Thus by rocking the shaft 27 the valve disc 23 can be moved to cover or uncover the inlet 19 of the upper passage 17. A similar arcuate valve disc 28 is slidably held in an arcuate slot 29 below the lower inlet 18 and is connected by a bar 31 to the rocking shaft 27 so as to be moved into inlet closing or opening positions as the shaft 27 is rocked in opposite directions. It is to be noted that the bars 26 and 31 are at such angle as to move the lower valve disc 28 into inlet closing position as the upper valve disc 23 is moved into inlet opening positions and vice versa. In this manner the pressure on the opposite sides may be varied in any selected ratio. By releasing an airstream the lift is changed and the pressure conditions vary on the aerofoil. It is to be also noted that the outlets 21 and 22 are at an angle to the line of the respective passages 16 and 17 so that the air stream impinging thereon also creates a positive reaction or force in addition to the vacuum destroying action of the airstream. The valve shaft 27 is suitably connected to a remote control in the pilot's compartment. The remote control may be hydraulic or electrical or mechanical, but in all cases concealed entirely within the aircraft.

Steering control is achieved by discharging airstreams at the tail surfaces of the aircraft, for instance near the fixed horizonal tail surface, such as the stabilizer 31, for nosing the aircraft downwardly or upwardly. There is an upwardly extending outlet 32 on the tail 33 of the aircraft discharging upwardly, so as to react downwardly and also to increase the pressure above said stabilizer 31 thereby to lower the stabilizer 31 and to nose the aircraft upwardly. A downwardly extending outlet 34 discharges an airstream below the stabilizer 31 so as to react upwardly and to increase the pressure below the stabilizer 31 thereby to lift the same and to nose the aircraft downwardly.

Outlet orifices 36 and 37 on the opposite sides of the tail 33 and of the vertical fin 38 discharge sideways for increasing the pressure on the respective sides of the tail surface and also reacting oppositely to their direction of discharge for moving the fin 38 and tail 33 to move to the right or left thereby to steer the aircraft laterally.

Figure 2:
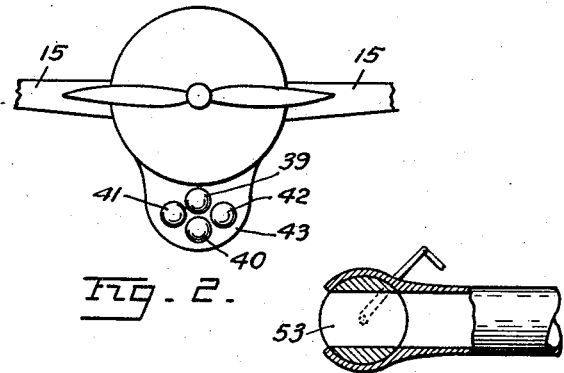
Fig. 2 is a front view of an arrangement of the control passages in my aircraft.

The outlets 32, 34, 36 and 37 are the rearward angular ends of ducts which latter conduct an atmospheric stream of air from the forward end through the body of the aircraft. These ducts are preferably tapered toward their respective outlets so as to increase the velocity and the pressure of airflow therethrough. There are various arrangements of ducts possible. For instance as shown in Fig. 2 there may be four ducts 39, 40, 41 and 42 respectively leading to the outlet orifices 32, 34, 36 and 37. These ducts are open at the front ends thereof and are inclosed in a suitably streamlined casing or cowling 43 along the bottom of the fuselage of the aircraft.

Figure 3:
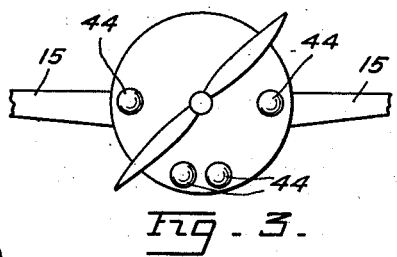
Fig. 3 is a front view of a modified arrangement of my aircraft control.
Figure 4:
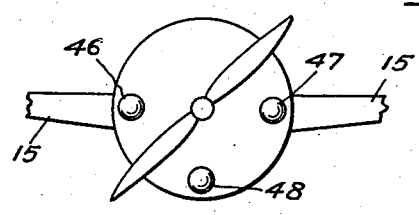
Fig. 4 is another modified arrangement of my aircraft control.
Figure 5:
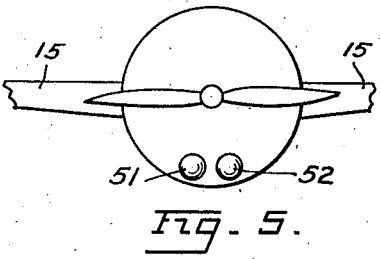
Fig. 5 is a double tube arrangement of my aircraft control.

In the arrangement shown in Fig. 3 the ducts 44 are grouped two at the bottom and one on each side of the fuselage, but at the tail end these ducts also assume the outlet position shown in Figures 10 and 11. In the arrangement shown in Fig. 4 the ducts 46 and 47 lead respectively to side outlets 36 and 37. The duct 48 at the bottom serves two outlets and can be selectively connected by a suitable valve mechanism 49 either to the upper tail outlet 32 or to the lower tail outlet 34. When only two ducts 51 and 52 are used, as shown in Fig. 5, then the valve mechanism 49 used at the tail end of each selectively directs the stream of air to the respective outlets. Whenever a single duct is used for two outlets it is branched at the tail of the aircraft and is there provided with a selective valve mechanism.

Figure 6:
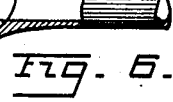
Fig. 6 is an illustration of an inlet valve for the tubes or passages of my aircraft control.

Each duct is preferably controlled by a valve at its intake end, such as the valve 53 in Fig. 6, which latter is suitably connected to a remote control in the control compartment of the aircraft by means entirely concealed within the aircraft. The ducts and passages are preferably surrounded by jackets 54 which latter are connected by suitable conduits 56 to the exhaust of the engine of the aircraft or to other suitable heating medium for heating the airstream as it passes through the respective passages and ducts. In this manner the airstream is also expanded and this with the acceleration of flow further increases a reaction at the outlets and enhances the controlling and regulating action of the airstreams. The various valves controlling and regulating the air flow through said passages and ducts are suitably connected to remote control mechanisms in the pilot's compartment not herein shown. The maneuvering of the aircraft on the ground is facilitated by the usual manually operated tailskid, not shown.

Having thus described my invention what I now claim and desire to secure by Letters Patent is:

1. An aerofoil having separate air ducts therein extended from the leading edge of the airfoil respectively to the top and undersurface of the airfoil, and means to simultaneously and oppositely control the intakes of both air ducts.

2. An aerofoil having separate air ducts therein extended from the leading edge of the airfoil respectively to the top and undersurface of the airfoil, and means to simultaneously and oppositely control the flow through said ducts.

3. An aerofoil having separate air ducts therein extended from the leading edge of the airfoil respectively to the top and undersurface of the airfoil, and means to regulate the flow through said ducts at the intake thereof, an outlet of each duct being at an angle to the direction of the duct, and the passage of each air duct being gradually narrowed toward said outlet.

4. An aerofoil having separate heated air ducts to conduct air from the atmosphere at the leading edge of said aerofoil to the atmosphere respectively at the top or underside of said aerofoil, each duct gradually decreasing toward its outlet.

5. An aerofoil having separate heated air ducts to conduct air from the atmosphere at the leading edge of said aerofoil to the atmosphere respectively at the top or underside of said aerofoil, and means for simultaneously and oppositely regulating the flow through said ducts.

6. In an aircraft, an aerofoil having forwardly facing orifices at its leading edge open to atmospheric stream of air, ducts of gradually decreasing passage in said aerofoil extending rearwardly from said orifices, and substantially opposite outlet orifices on the top and underside of said aerofoil forming the discharge ends of the respective ducts at an angle to the axis of the respective ducts.

7. In an aircraft, a horizontal control surface, a discharge orifice on each side of said surface, ducts extended rearwardly through the aircraft to each of said orifices, said ducts having substantially forward intakes open to admit a stream of air from the atmosphere to said ducts, said ducts being uninterrupted up to said discharge orifices, and means for selectively regulating the airflow through said ducts.

8. In an aircraft, a vertical control surface, substantially opposite discharge orifices on opposite sides thereof, a separate duct extended to each orifice, the forward end of each duct being communicated with the atmosphere substantially forwardly to the direction of flight of the aircraft, and means for substantially simultaneously and oppositely regulating the air intake into said ducts.

9. In an aircraft, means to control the altitude of the aircraft at the tail surfaces, comprising a plurality of separate ducts extended from the nose of the aircraft rearwardly, a plurality of outlet orifices for the ducts, said orifices being arranged so as to discharge streams to opposite sides of the respective tail surfaces, the forward ends of the ducts being open to the atmosphere, and means for simultaneously and oppositely regulating the airflow through said ducts.

10. In an aircraft, aerofoils having separate passages extended from the leading edge thereof to the top and underside of the aerofoil, valve means to regulate the opening of the passages at said leading edge, and means to simultaneously operate said valve means oppositely with respect to the respective openings of said passages.

11. In an airfoil, a pair of elongated air ducts, intakes for said air ducts at the leading edge of the airfoil, an offset outlet from one air duct to one side of the airfoil, another offset outlet from the other duct to the other side of the airfoil, and means to simultaneously and oppositely control the intakes of said air ducts.

12. In an aircraft, a plurality of air ducts extended from the nose to the tail of the aircraft, a plurality of outlets leading from the tail ends of the respective air ducts to different sides of the adjacent tail surfaces, means to control the opening of the inlet ends of the air ducts, and means to selectively and simultaneously control flow to the outlets of respective air ducts.

GEORGE H. WRIGHT.